United States Patent
Holly

(10) Patent No.: US 11,852,070 B2
(45) Date of Patent: *Dec. 26, 2023

(54) PRE-CHAMBER SPARK PLUG FOR A COMBUSTION CHAMBER OF A COMBUSTION ENGINE, COMBUSTION ENGINE AND MOTOR VEHICLE

(71) Applicant: Mercedes-Benz Group AG, Stuttgart (DE)

(72) Inventor: Werner Holly, Merklingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/907,927

(22) PCT Filed: Feb. 15, 2021

(86) PCT No.: PCT/EP2021/053609
§ 371 (c)(1),
(2) Date: Aug. 29, 2022

(87) PCT Pub. No.: WO2021/175573
PCT Pub. Date: Sep. 10, 2021

(65) Prior Publication Data
US 2023/0009522 A1    Jan. 12, 2023

(30) Foreign Application Priority Data
Mar. 4, 2020 (DE) .................... 10 2020 001 382.1

(51) Int. Cl.
*F02B 19/18* (2006.01)
*F02B 19/12* (2006.01)

(52) U.S. Cl.
CPC .............. *F02B 19/18* (2013.01); *F02B 19/12* (2013.01)

(58) Field of Classification Search
CPC .......... F02B 19/18; F02B 19/12; F02B 19/08; F02B 19/1019; F02B 19/1023; F02B 19/1014
See application file for complete search history.

(56) References Cited

U.S. PATENT DOCUMENTS

2013/0055986 A1   3/2013   Tozzi et al.
2013/0199483 A1   8/2013   Herden et al.
(Continued)

FOREIGN PATENT DOCUMENTS

CN   109386375 A   2/2019
CN   112639264 A   4/2021
(Continued)

OTHER PUBLICATIONS

PCT/EP2021/053609, International Search Report dated Mar. 19, 2021 (Two (2) pages).
(Continued)

*Primary Examiner* — Xiao En Mo
(74) *Attorney, Agent, or Firm* — Crowell & Moring LLP

(57) ABSTRACT

A pre-chamber spark plug for a combustion chamber of an internal combustion engine includes a pre-chamber which has a plurality of openings. A fuel-air mixture is introducible from the combustion chamber into the pre-chamber via the plurality of openings. With respect to an imaginary plane running in a longitudinal extension direction of the pre-chamber and dividing the pre-chamber into a first half and a second half of equal size, first openings are disposed in the first half and second openings are disposed in the second half. The first openings enclose a respective first angle with the imaginary plane, the second openings enclose a respective second angle with the imaginary plane, and a mean value of the first angles is greater than a mean value of the second angles. The plurality of openings are configured (Continued)

rotationally asymmetrically about an imaginary axis running on the imaginary plane.

7 Claims, 2 Drawing Sheets

(56) References Cited

U.S. PATENT DOCUMENTS

| | | | |
|---|---|---|---|
| 2019/0048784 A1* | 2/2019 | Ashizawa | ........... F02B 19/1023 |
| 2021/0348544 A1 | 11/2021 | Holly | |

FOREIGN PATENT DOCUMENTS

| | | |
|---|---|---|
| DE | 10 2018 117 726 A1 | 2/2019 |
| DE | 10 2017 009 235 A1 | 4/2019 |
| DE | 10 2018 007 093 A1 | 3/2020 |
| EP | 2 700 796 A1 | 2/2014 |
| EP | 2 927 458 A1 | 10/2015 |
| EP | 3 536 923 A1 | 9/2019 |
| EP | 3 536 924 A1 | 9/2019 |
| JP | 2006-144648 A | 6/2006 |
| JP | 2012-211594 A | 11/2012 |
| JP | 2014-62484 A | 4/2014 |
| JP | 2018-96217 A | 6/2018 |

OTHER PUBLICATIONS

German-language German Office Action issued in German application No. 10 2020 001 382.1 dated Oct. 8, 2020 (Nine (9) pages).
U.S. Patent Application, "Pre-Chamber Spark Plug for a Combustion Chamber of an Internal Combustion Engine, Internal Combustion Engine, and Motor Vehicle", filed Sep. 2, 2022, Inventor: Werner Holly.
U.S. Patent Application, "Pre-Chamber Spark Plug for a Combustion Chamber of a Combustion Engine, Combustion Engine, and Motor Vehicle", filed Sep. 2, 2022, Inventor: Werner Holly.
Chinese Office Action issued in Chinese Application No. 202180018689.9 dated Aug. 22, 2023, with partial English translation (10 pages).
Japanese Office Action issued in Japanese Application No. 2022-552504 dated Aug. 15, 2023, with English translation (7 pages).

* cited by examiner

PRE-CHAMBER SPARK PLUG FOR A COMBUSTION CHAMBER OF A COMBUSTION ENGINE, COMBUSTION ENGINE AND MOTOR VEHICLE

BACKGROUND AND SUMMARY OF THE INVENTION

The invention relates to a pre-chamber spark plug for a combustion chamber of a combustion engine, in particular of a motor vehicle. Furthermore, the invention relates to a combustion engine for a motor vehicle. The invention also relates to a motor vehicle, in particular a motor car.

EP 2 700 796 A1 discloses a pre-combustion chamber tip of a combustion chamber arrangement of an internal combustion engine. Furthermore, a pre-combustion chamber is known from US 2013/0055986 A1. JP 2012-211 594 A discloses a pre-chamber spark plug for an internal combustion engine. DE 10 2018 117 726 A1 discloses an internal combustion engine. Moreover, a pre-chamber spark plug for a combustion chamber of a combustion engine is known from DE 10 2018 007 093 A1.

The object of the present invention is to create a pre-chamber spark plug for a combustion chamber of a combustion engine, a combustion engine having at least one such pre-chamber spark plug and a motor vehicle, such that a particularly advantageous operation of the combustion engine can be implemented.

A first aspect of the invention relates to a pre-chamber spark plug for a combustion chamber of a combustion engine, also referred to as an internal combustion engine, in particular for a motor vehicle. The pre-chamber spark plug has a pre-chamber with a plurality of openings, for example in the form of through-openings, via which the pre-chamber can be or is fluidically connected to the combustion chamber. In particular, the opening can run straight or in a straight line, preferably over its entire extension. A fuel-air mixture, also referred to simply as a mixture, can be introduced from the combustion chamber into the pre-chamber via the respective opening. For example, at least one ignition spark can be generated in the pre-chamber. For this purpose, the pre-chamber spark plug comprises, for example, at least one electrode device which is arranged at least partially in the pre-chamber. By means of the electrode device, the aforementioned ignition spark can be generated in the pre-chamber. By means of the ignition spark, the fuel-air mixture that has flowed into the pre-chamber via the openings can be ignited or sparked and subsequently burned, such that, for example, flames or burning flares resulting from the ignition of the mixture can flow out of the pre-chamber via the openings and can reach or flow into the combustion chamber. As a result, the mixture remaining in the combustion chamber, for example, is ignited and burnt in the combustion chamber.

The respective opening has a respective flow cross-section through which the mixture or the respective flare can flow. The respective flow cross-section is thus a surface through which the mixture can flow, for example, or has a surface or a surface area and the mixture can flow through it.

In order to now be able to implement a particularly advantageous operation of the combustion engine, it is provided according to the invention that, with respect to an imaginary or virtual plane running in the longitudinal extension direction of the pre-chamber and thus running in parallel to the longitudinal extension direction of the pre-chamber and thus of the pre-chamber spark plug as a whole and which divides or subdivides the pre-chamber into two equal halves, several, i.e., at least two first ones, of the openings are arranged in a first of the halves of the pre-chamber and several, i.e., at least two second ones, of the openings are arranged in the second half of the pre-chamber. The respective half of the pre-chamber is also referred to as the pre-chamber half, for example. Here, the first openings enclose a respective first angle, in particular lying in the first half, with the plane, also referred to as the first plane. In other words, the respective first opening or each of the first openings encloses a respective first angle, for example lying in the first half or belonging to the first half, with the plane. Moreover, the second openings enclose a respective second angle, in particular lying in the second half, with the plane. In other words, the respective second opening or each of the second openings enclose a respective second angle, for example lying in the second half or belonging to the second half, with the plane. The feature that the respective opening encloses the respective angle with the plane is to be understood in particular as follows: the respective opening has, for example, a direction of passage in which the respective opening can be flowed through by the mixture or by the respective flare. The direction of passage is straight, for example, and thus runs along a respective opening axis of the respective opening, for example, wherein the respective opening axis is a respective straight line. Thus, the mixture or the flare can flow through the respective opening along the straight line. In particular, here it is conceivable that the respective flow cross-section of the respective opening runs on a respective opening plane, wherein the respective opening plane runs perpendicularly to the respective opening axis of the respective opening. In particular, the respective opening or the respective flow cross-section of the respective opening can be formed rotationally symmetrically with respect to the opening axis. Here, the respective opening axis of the respective first opening encloses the respective first angle with the plane, and the opening axis of the respective second opening encloses the respective second angle with the plane. The respective angle enclosed by the respective opening or the respective opening axis and the plane is to be understood, in particular, as the smallest or minimum of the angles enclosed by the respective opening or the respective opening axis and the plane.

Furthermore, it is provided according to the invention that the mean value of the first angles is greater than the mean value of the second angles. In particular, the respective mean value is to be understood as the arithmetic mean value, also referred to as the arithmetic mean. Thus, for example, the first mean value is obtained by dividing, i.e., splitting, the sum of the or all first angles by the number of the or all first angles. Accordingly, the second mean value is obtained, for example, by dividing, i.e., by sharing, the sum of the or all second angles by the number of the or all second angles.

Moreover, it is provided according to the invention that the openings are designed to be rotationally asymmetrical around an imaginary axis running on the plane. This means, for example, that the openings are arranged asymmetrically, i.e., unevenly distributed, around the axis and thus in the peripheral direction of the pre-chamber or pre-chamber spark plug running around the axis. Alternatively or additionally, the feature that the openings are designed or formed to be rotationally asymmetrical around the axis can be understood to mean that the or all openings around the axis follow one another in an uneven or disordered manner, i.e., not according to a regular sequence, in particular with regard to the different angles. In other words, the rotationally asymmetrical configuration can be understood to mean that the or all angles around the axis are uneven or disordered, i.e., do not follow one another in a regular order.

Furthermore, it is conceivable that at least two of the openings differ from one another in terms of their geometry, in particular in terms of the geometry of their respective flow cross-section, and thereby exhibit a rotationally asymmetrical sequence, in particular about the axis. This means in particular that the flow cross-sections of these at least two openings differ from each other, in particular with regard to their shape and/or size, i.e., area or surface area, wherein the at least two openings or preferably all the openings have a rotationally asymmetrical sequence around the axis. This means, in particular, that the at least two openings or preferably all openings around the axis follow each other in a non-uniform or disordered manner, i.e., not according to a regular order.

Since the mean values of the angles differ from one another, it is provided according to the invention that the openings are arranged or designed in the peripheral direction of the pre-chamber and thus rotationally asymmetrically, for example around an axis running in the longitudinal direction of the pre-chamber or in parallel to the longitudinal extension of the pre-chamber. The aforementioned axis is, for example, a longitudinal central axis of the pre-chamber, also referred to as the main axis, which can, for example, be rotationally symmetrical with respect to the axis or with respect to the longitudinal central axis, which is also referred to as the longitudinal axis.

In particular, it can be provided that the openings are formed rotationally asymmetrically around the axis, i.e., with respect to the axis. This is to be understood, for example, to mean in particular that the openings are arranged overall asymmetrically, i.e., unevenly distributed, around the axis and thus in the peripheral direction of the pre-chamber or the pre-chamber spark plug running around the axis. Alternatively or additionally, the feature that the openings are designed or formed rotationally asymmetrically around the axis can be understood to mean that at least two of the openings differ from each other in terms of their geometry, in particular in terms of the geometry of their respective flow cross-section. This means, in particular, that the flow cross-sections of these at least two openings differ from each other, in particular with regard to their shape and/or size, i.e., area or surface area.

Due to the rotationally asymmetrical arrangement or design of the openings provided according to the invention, the openings are designed to cause a tumble-shaped flow, also referred to as a cylindrical flow, roller flow or tumble flow, of the fuel-air mixture flowing through the openings and thus flowing into the pre-chamber via the openings. In other words, during a fired operation of the combustion engine, for example due to their arrangement and/or their number and/or their geometry, the openings cause a tumble-shaped flow of the fuel-air mixture, which is simply also referred to as mixture and flows through the opening and thereby flows from the combustion chamber into the pre-chamber, and which thus has a or the tumble-shaped flow in the pre-chamber. In other words again, the openings, which are formed for example as through-openings, impart an at least substantially tumble-shaped and thus cylindrical flow, which is also referred to as tumble flow, on the mixture flowing through the openings and thus flowing out of the combustion chamber, which is also referred to as the main combustion chamber, into the pre-chamber, such that a particularly advantageous operation of the pre-chamber spark plug and thus of the combustion engine as a whole can be realized. The tumble-shaped flow is a flow that is at least substantially cylindrical on at least or exactly one roller plane. This roller plane runs, for example, in the longitudinal extension direction of the pre-chamber spark plug, wherein the roller plane is, for example, the plane or runs obliquely or perpendicularly to the aforementioned plane. In particular, the tumble-shaped flow runs in a roll shape around a roll axis which runs perpendicularly to the roll plane and is thus a or the plane normal of the roll plane. For example, the roller axis runs in the aforementioned plane.

In contrast to a flow which is rotationally symmetrical, in particular with respect to the axis, and which extends, for example, in a helical or ring-like manner around the main axis or around the steering axis of the pre-chamber, the tumble-shaped flow is a cylindrical flow, also referred to as a roller flow, which extends, for example, at least partially in the roller plane or runs in the roller plane on which, for example, the axis, in particular the main axis, lies or runs. The aforementioned, conventionally provided rotationally symmetrical flow can result in particular from an arrangement and design of the openings that is rotationally symmetrical, in particular with respect to the axis, wherein now, however, according to the invention, an arrangement or design of the openings that is rotationally asymmetrical with respect to the axis is provided.

The tumble flow positively influences the combustion in the pre-chamber in several ways, whereby a particularly large operating range of the pre-chamber spark plug or in the pre-chamber can be realized. On the one hand, there is better flushing of residual gas in the region of a spark plug gap, which is formed or delimited, for example, by respective electrodes, in particular by respective ends of the electrodes. The electrodes are, for example, electrodes of the aforementioned electrode device. The in particular free ends are arranged in the pre-chamber, for example. The ignition spark for igniting the mixture in the pre-chamber can be generated in the spark plug gap, for example, by means of the electrodes. Due to the improved flushing, a more stable ignition can be guaranteed. Compared to conventional spark plugs, there is a more favourable convection of an initial flame core in the direction of the openings, also called nozzles or designed as nozzles. Due to the better flushing and due to the more favourable convection, a more combustion-favourable design of the respective electrode of the pre-chamber spark plug can be achieved, in particular with regard to a lower penetration depth of the electrode designed, for example, as a ground electrode. This results in a smaller surface area, which in turn results in lower wall heat losses. This can reduce the tendency to pre-ignition compared to conventional pre-chamber spark plugs.

In conventional pre-chamber spark plugs, the openings cause an at least substantially rotationally symmetrical flow of the mixture flowing through the openings and thus flowing out of the combustion chamber into the pre-chamber, in particular due to their rotationally symmetrical arrangement. The disadvantage of this is that the initial flame core is not convected or is convected away from the openings, which are also referred to as pre-chamber nozzles. In order to ensure sufficiently low residual gas contents in the region of the spark plug gap in conventional pre-chamber spark plugs, a long electrode must usually be used that projects deep into the pre-chamber. This results in a fissured surface in the pre-chamber as well as a large damage volume. The previously mentioned problems and disadvantages can be avoided with the pre-chamber spark plug according to the invention.

The combustion in the pre-chamber is stabilized and improved by the tumble flow. This enlarges the working area of the pre-chamber spark plug, such that a more stable ignition when idling and a lower risk of pre-ignition at preload can be realized. Furthermore, the improved combustion results in a greater pressure increase in the pre-chamber and consequently a deeper flare penetration depth into the combustion chamber. This also improves combustion in the combustion chamber, which is also referred to as the main combustion chamber. The flare penetration depth is to be understood, in particular, as a distance or depth or path that the flares penetrate into the pre-chamber or into the combustion chamber. The respective flare results from the fact that the mixture is ignited in the pre-chamber and subsequently burnt.

Conventionally, pre-chamber spark plugs can be differentiated according to the flow structure in the pre-chamber. In particular, according to the prior art, a distinction can be made between structureless (chaotic) flow forms in the pre-chamber and rotationally symmetrical flow forms. The flow structure is determined in particular by the arrangement of the openings and by the design of the openings. For rotationally symmetrical flow structures according to the prior art, the arrangement of the openings is rotationally symmetrical around the aforementioned axis, which is for example the main axis of the pre-chamber. According to the invention, however, a rotationally asymmetrical design and, in particular, arrangement of the openings is now provided, such that a particularly advantageous operation can be realized.

The number of the first openings arranged in the first half is greater than the number of the second openings arranged in the second half, wherein the openings are designed as bores and/or the pre-chamber is designed rotationally symmetrically with respect to the axis. This ensures a particularly advantageous operation.

Alternatively or additionally, the sum of the flow cross-sections of the first openings arranged in the first half is greater than the sum of the flow cross-sections of the second openings arranged in the second half, wherein the openings are designed as bores and/or the pre-chamber is designed rotationally symmetrically with respect to the axis. Thus, for example, a particularly advantageous tumble-shaped flow of the mixture in the pre-chamber can be realized.

Alternatively or additionally, the flow cross-sections of at least two of the openings differ from one another in terms of their shape.

In order to realize a particularly advantageous operation, it is provided in an embodiment of the invention that the respective angle lies on a respective angular plane running in the longitudinal extension direction of the pre-chamber and thus in parallel to the pre-chamber and extending obliquely or perpendicularly to the first plane. In particular, for at least or exactly one of the first angles and, for example, for at least or exactly one of the second angles, the angular plane can be the aforementioned roller plane.

A further embodiment is characterized in that the first plane and the respective angular plane intersect in the imaginary axis, whereby a particularly efficient and effective operation can be ensured.

In order to be able to realize a particularly advantageous operation, it is provided in a further design of the invention that the or all openings are arranged in an imaginary circle, the center of which lies on the axis, wherein the first plane divides the circle into two halves of equal size. A first of the halves of the circle is arranged, for example, in the first half of the pre-chamber, in particular completely, wherein the second half of the circle is arranged, for example, in the second half of the pre-chamber, in particular completely. In this way, a particularly effective and efficient operation can be depicted.

A further embodiment is characterized in that the or all flow cross-sections of the first openings arranged in the first half are larger than the or all flow cross-sections of the second openings arranged in the second half. This ensures particularly advantageous flow conditions and thus particularly advantageous operation.

In a further design of the invention, the mean value of the or all flow cross-sections of the first openings arranged in the first half is greater than the mean value of the flow cross-sections of the second openings arranged in the second half. These respective mean values are also preferably to be understood as the respective arithmetic mean.

For example, the respective openings and thus the respective flow cross-sections, in particular all flow cross-sections, are circular, such that the respective flow cross-section has a respective diameter. It is preferably provided that the or all diameters of the first openings arranged in the first half are larger than the or all diameters of the second openings arranged in the second half.

A second aspect of the invention relates to a combustion engine, preferably in the form of a reciprocating piston engine, for a motor vehicle, which may preferably be in the form of a motor car and very preferably in the form of a passenger car or a commercial vehicle. The combustion engine has at least one combustion chamber. The combustion chamber is, for example, partially delimited by a cylinder and by a piston of the combustion engine, which is arranged in the cylinder such that it can move in translation, wherein the cylinder is formed or delimited, for example, by an engine housing of the combustion engine which is designed, in particular, as a crankcase or cylinder crankcase. In addition, the combustion chamber is, for example, partially delimited by a combustion chamber roof, which is formed, for example, by a cylinder head formed separately from the engine housing and connected to the engine housing. The combustion engine further comprises at least one pre-chamber spark plug allocated to the combustion chamber, which is arranged, for example, at least partially in the combustion chamber. The pre-chamber spark plug comprises a pre-chamber with several openings via which the pre-chamber is fluidically connected to the combustion chamber, also referred to as the main combustion chamber. A fuel-air mixture, also referred to simply as a mixture, can be introduced or flow into the pre-chamber from the combustion chamber via the openings. In other words, for example, the aforementioned fuel-air mixture is formed in the combustion chamber or the fuel-air mixture is introduced into the combustion chamber. For example, fuel, in particular liquid fuel, and air are introduced into the combustion chamber. For example, the fuel is injected directly into the combustion chamber. Here, the aforementioned mixture comprises the air and the fuel that are or were introduced into the combustion chamber.

At least one part of the mixture from the combustion chamber can flow through the openings and thus flow into the pre-chamber via the openings. In the pre-chamber, the part of the mixture can be ignited and burnt, resulting in the flares described above. The flares can then flow out of the pre-chamber via the openings and flow into the main combustion chamber, where they ignite and subsequently burn the mixture remaining in the main combustion chamber. The respective opening here has a respective flow cross-section through which the mixture or the respective flare can flow.

In order to now be able to realize a particularly advantageous operation, it is provided according to the invention that, with respect to an imaginary or virtual plane running in the longitudinal direction of the pre-chamber and dividing the pre-chamber into two equal halves, several first ones of the openings are arranged in a first of the halves and several second ones of the openings are arranged in the second half of the pre-chamber. Here, the first openings form a respective first angle with the plane, and the second openings form a respective second angle with the plane. The mean value of the or all first angles is greater than the mean value of the or all second angles. In addition, it is provided according to the invention that the openings, in particular with regard to their respective angles, are rotationally asymmetrical around an imaginary axis extending in the plane.

The number of first openings arranged in the first half is greater than the number of second openings arranged in the second half, wherein the openings are designed as bores and/or the pre-chamber is designed rotationally symmetrically with respect to the axis. This ensures a particularly advantageous operation.

Alternatively or additionally, the sum of the flow cross-sections of the first openings arranged in the first half is greater than the sum of the flow cross-sections of the second openings arranged in the second half, wherein the openings are designed as bores and/or the pre-chamber is designed rotationally symmetrically with respect to the axis. In this way, for example, a particularly advantageous tumble-shaped flow of the mixture in the pre-chamber can be realized.

Alternatively or additionally, the flow cross-sections of at least two of the openings differ from each other in terms of their shape.

Advantages and advantageous designs of the first aspect of the invention are to be regarded as advantages and advantageous designs of the second aspect of the invention and vice versa.

A third aspect of the invention relates to a motor vehicle, preferably in the form of a motor car, which has a combustion engine according to the invention in accordance with the second aspect of the invention. The motor vehicle can be driven by means of the combustion engine. Advantages and advantageous embodiments of the first and second aspects of the invention are to be regarded as advantages and advantageous embodiments of the third aspect of the invention and vice versa.

Further advantages, features and details of the invention emerge from the following description of a preferred exemplary embodiment and from the drawings. The features and combinations of features mentioned above in the description, as well as the features and combinations of features mentioned below in the description of the figures and/or shown alone in the figures, can be used not only in the respectively specified combination, but also in other combinations or on their own, without leaving from the scope of the invention.

DETAILED DESCRIPTION OF THE DRAWINGS

Figure 1:
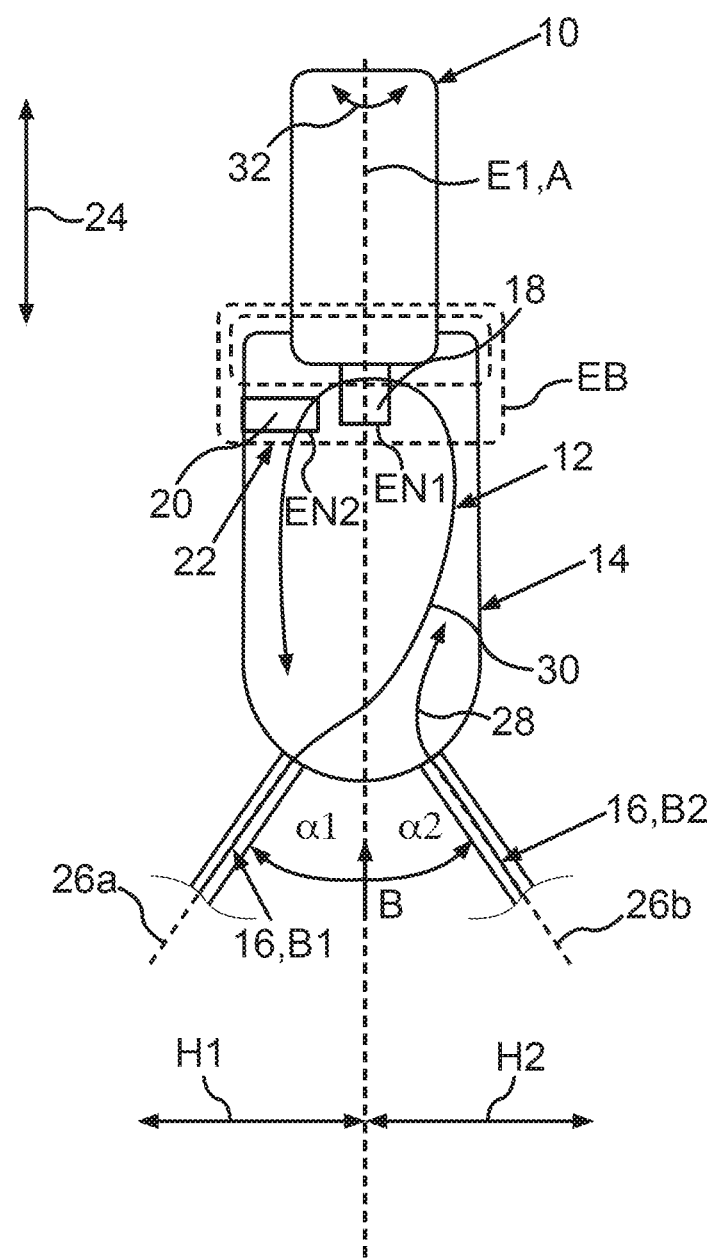
FIG. 1 is a schematic and sectional side view of a pre-chamber spark plug according to the invention for a combustion chamber of a combustion engine of a motor vehicle.

In the figures, the same or functionally identical elements are provided with the same reference numerals.

In a schematic and sectional side view, FIG. 1 shows a pre-chamber spark plug 10 for a combustion chamber, formed for example by a cylinder or designed as a cylinder or at least partially delimited by a cylinder, of a combustion engine, designed for example as a reciprocating piston engine, of a motor vehicle, in particular a motor car such as a passenger car or a commercial vehicle, for example. The motor vehicle can be driven by means of the combustion engine. The pre-chamber spark plug 10 has at least or exactly one pre-chamber 12, the contour of which is marked 14 in FIG. 1. The pre-chamber 12 has several openings 16, also referred to as nozzles and designed as through-openings, which can also be seen particularly well in FIG. 2. Via the openings 16, the pre-chamber 12 can be or is fluidically connected to the combustion chamber, which is also referred to as the main combustion chamber. In its fully manufactured state, the combustion engine has the aforementioned combustion chamber and the pre-chamber spark plug 10, such that, in the fully manufactured state of the combustion engine, the pre-chamber 12 is fluidically connected to the combustion chamber via the openings 16. In doing so, a fuel-air mixture, which is simply also referred to as a mixture, can at least partially flow out of the combustion chamber, which is also referred to as the main combustion chamber, through the openings 16 and thus flow into the pre-chamber 12, such that at least part of the mixture from the combustion chamber can flow through the openings 16 and thus can flow or does flow into the pre-chamber 12 via the openings 16. The combustion chamber is also delimited, for example, by a piston of the combustion engine.

The pre-chamber spark plug 10 has at least or exactly two electrodes 18 and 20 of an electrode device 22 arranged at least partially in the pre-chamber 12. In particular, respective free ends EN1 and EN2 of the electrodes 18 and 20 are arranged in the pre-chamber 12 and are spaced apart from each other. The electrode 18 is, for example, a so-called center electrode, wherein the electrode 20 is, for example, designed as a so-called mass electrode or ground electrode. By means of the electrode device 22, in particular by means of the electrodes 18 and 20, at least one ignition spark can be generated in the pre-chamber 12, in particular during fired operation of the combustion engine and/or within a respective operating cycle of the combustion engine, in particular at an ignition location also referred to as a spark location. In particular, the ignition spark can be generated by means of the electrodes 18 and 20 between the electrodes 18 and 20, in particular between the ends EN1 and EN2, such that, for example, the electrodes 18 and 20, in particular the ends EN1 and EN2, form, define, delimit or limit the ignition location. By means of the ignition spark, the mixture which has flowed into the pre-chamber 12 via the openings 16 can be ignited, whereby the mixture is burnt in the pre-chamber 12. This results in burning flares that flow through the openings 16 and thus flow out of the pre-chamber 12 into the combustion chamber via the openings 16. As a result, for example, a portion of the mixture remaining in the main combustion chamber is ignited and subsequently burned, thereby driving the piston. In other words, the electrodes 18 and 20 can be used to generate or provide the ignition spark at the ignition location in the pre-chamber 12.

Figure 2:
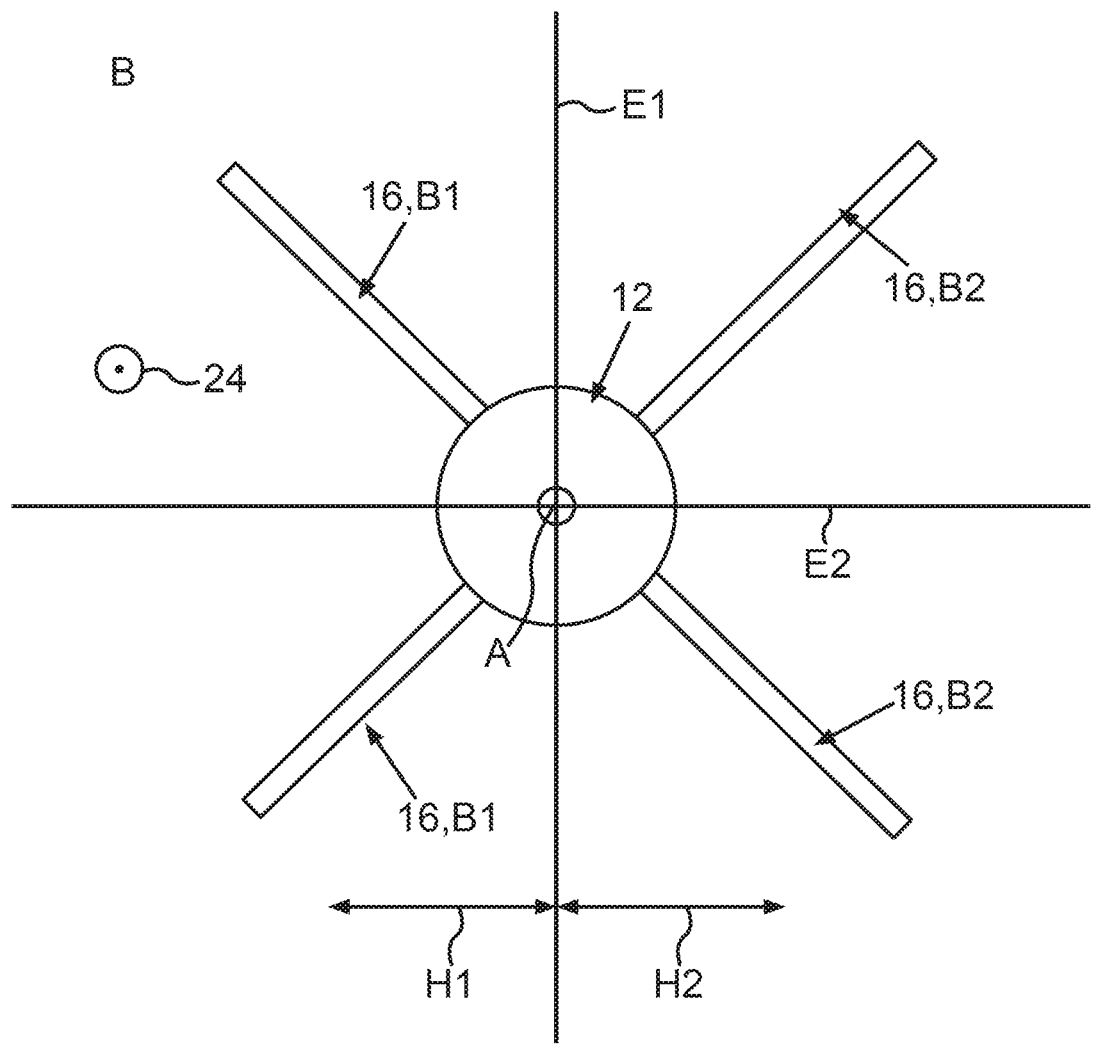
FIG. 2 is a schematic view of the pre-chamber spark plug along a viewing direction marked B in FIG. 1.

In FIGS. 1 and 2, a first, imaginary plane E1 can be seen, which runs in the longitudinal direction of the pre-chamber 12 and thus of the pre-chamber spark plug 10 as a whole. In other words, the plane E1 runs in parallel to the longitudinal extension direction of the pre-chamber 12 or of the pre-chamber spark plug 10, wherein the longitudinal extension direction is illustrated in FIG. 1 by a double arrow 24. In addition, an axis A can be seen in FIGS. 1 and 2, which is a or the main axis of the pre-chamber 12 and thus of the pre-chamber spark plug 10. The main axis is also referred to as the longitudinal axis or the longitudinal central axis, wherein, for example, the pre-chamber 12 is rotationally symmetrical with respect to the axis A. The axis A is located on or runs on the plane E1, wherein the plane E1 runs perpendicular to the image plane of FIG. 1 and perpendicular to the image plane of FIG. 2. For example, the openings 16 are arranged around the axis A, in particular along a circle or on a circle, the center of which lies on the axis A, for example.

It can be seen from FIGS. 1 and 2 that the imaginary plane E1 divides or subdivides the pre-chamber 12 into two equal halves H1 and H2, also referred to as chamber halves or pre-chamber halves. The first of the openings 16, referred to as B1, is arranged, in particular completely, in the first half H1, while the second of the openings 16, referred to as B2, is arranged, in particular completely, in the second half H2.

Moreover, an imaginary or virtual second plane E2 can be seen in FIG. 2. The second, imaginary plane E2 also runs in parallel to the longitudinal direction or in the longitudinal direction of the pre-chamber 12 and thus of the pre-chamber spark plug 10, wherein the second plane E2 simultaneously runs perpendicularly to the first plane E1. In this case, the planes E1 and E2 intersect in the axis A, as can be seen particularly well from FIG. 2. As will be explained in more detail below, the plane E2 is a roller plane.

From FIG. 1, it can be seen in the example of one of the openings B1 that the respective first opening B1 or each of the first openings B1 encloses a respective first angle $\alpha 1$ with the first plane E1, wherein the respective first angle $\alpha 1$ is located, for example, in the first half H1 or belongs to the first half H1 or is arranged on sides of the half H1. Moreover, the respective second opening B2 or each of the second openings B2 encloses with the first plane E1 a respective second angle $\alpha 2$ which is located, for example, in the second half H2 or belongs to the second half H2 or is arranged on sides of the second half H2. Here, the arithmetic mean value of the or all first angles $\alpha 1$ is greater than the arithmetic mean value of the or all second angles $\alpha 2$.

The angles $\alpha 1$ and $\alpha 2$ will be explained in more detail below: As can be seen from FIG. 1 using the example of the openings B1 and B2 that can be seen there, the respective first opening B1 has a respective opening axis 26a, and the respective second opening B2 has a respective opening axis 26b. Moreover, the respective opening 16 is designed as a straight line across its complete extension. The respective opening axis 26a or 26b is a straight line and runs in a passage direction or coincides with a respective passage direction of the respective opening B1 or B2, wherein the mixture or the respective flare can flow through the respective opening B1 or B2 in the passage direction. In particular, the respective opening B1 or B2 is designed rotationally symmetrically with respect to its respective opening axis 26a or 26b, which is an imaginary or virtual axis. Here, the feature that the respective opening B1 encloses the respective angle $\alpha 1$ with the plane E1 is to be understood as meaning that the respective opening axis 26a of the respective opening B1 encloses the respective angle $\alpha 1$ with the plane E1. Accordingly, the feature that the respective opening B2 includes the respective angle $\alpha 2$ with the plane E1 is to be understood to mean that the respective opening axis 26b of the respective opening B2 includes the respective angle $\alpha 2$ with the plane E1.

Due to the described design of the openings 16, the openings 16 are designed to cause an at least substantially tumble-shaped, i.e., cylindrical, flow of the mixture flowing through the openings 16 and thus flowing into the pre-chamber 12 via the openings 16, wherein the tumble-shaped flow of the mixture takes place or is carried out in the pre-chamber 12. This tumble-shaped flow of the mixture in the pre-chamber 12 is illustrated in FIG. 1 by arrows 28 and 30. In particular, it can be seen from the arrow 30 that the tumble-shaped flow runs in a roller-shaped manner on a roller plane, wherein the roller plane runs in parallel to plane E2, for example, or is plane E2. In particular, the arrows 28 and 30 shown in FIG. 1 illustrate a contour of the tumble-shaped flow, also referred to as a flow contour. In particular, the tumble-shaped flow runs in the shape of a roller around a or the plane normal of the roller plane, wherein the plane normal runs on the plane E1, for example, and here perpendicularly to the axis A.

Since the mean value of the or all first angles $\alpha 1$ is greater than the mean value of the or all second angles $\alpha 2$, the openings 16 are designed or arranged rotationally asymmetrically around the axis A, whereby the tumble-shaped flow can be realized particularly advantageously. In particular, the tumble-shaped flow is thus caused by the distribution of the openings 16 around the axis A and/or by a corresponding number of the openings 16 and/or by a respective geometry of the openings 16, in particular their flow cross-sections. In particular, the angle $\alpha 1$ or $\alpha 2$ or the angular sector of $\alpha 1$ and $\alpha 2$ which has the smallest numerical value is used. Again expressed in other words, the respective angle $\alpha 1$ or $\alpha 2$ is preferably the smallest of the angles enclosed by the respective opening B1 or B2 or by the respective opening axis 26a or 26b and the planes E1.

Moreover, in FIG. 1 an electrode region is referred to as EB in which, for example, the electrodes 18 and 20, in particular their ends EN1 and EN2, are arranged in the pre-chamber 12. Due to the tumble-shaped flow, a volume V of the pre-chamber 12, also referred to as the damage volume, can be kept particularly low, such that a particularly large operating range of the pre-chamber spark plug 10 can be realized. Thus, a particularly advantageous operation can be depicted.

The openings 16 are arranged one after the other in the peripheral direction of the pre-chamber 12 or pre-chamber spark plug 10, in particular along the axis A, wherein the peripheral direction is illustrated in FIG. 1 by a double arrow 32.

The tumbler flow has a flow center which is orthogonal to the main axis or axis A of the pre-chamber 12. The flow center is an aforementioned roller axis around which the tumble flow runs in a roller shape. The roller axis runs predominantly perpendicularly or orthogonally to the plane E2 and, for example, on the plane E1 or in parallel to the plane E1, such that, for example, the plane E2 is the aforementioned roller plane. Here, the tumble flow can be defined as a flow structure in which the flow of the mixture in the second half H2 flows upwards from the openings 16 towards the electrode area EB, which is also referred to as upward flow. Thereafter, the flow flows through the electrode region EB, whereupon the flow flows downwardly away from the electrode region EB and here flows in the direction of the openings 16, which is also referred to as downward flow. Thus, the tumble flow is a structured flow shape, which, however, is not rotationally symmetrical to the pre-chamber main axis or to the main axis of the pre-chamber 12.

LIST OF REFERENCE CHARACTERS

10 Pre-chamber spark plug
12 Pre-chamber

14 Contour
16 Opening
18 Electrode
20 Electrode
22 Electrode device
24 Double arrow
26a Opening axis
26b Opening axis
28 Arrow
30 Arrow
32 Double arrow
A Axis
B1 Opening
B2 Opening
EB Electrode region
EN1 End
EN2 End
E1 Plane
E2 Plane
H1 Half
H2 Half

The invention claimed is:

1. A pre-chamber spark plug (10) for a combustion chamber of an internal combustion engine, comprising:

a pre-chamber (12) which has a plurality of openings (16, B1, B2) and which is fluidically connectable to the combustion chamber via the plurality of openings (16, B1, B2), wherein a fuel-air mixture is introducible from the combustion chamber into the pre-chamber (12) via the plurality of openings (16, B1, B2);

wherein, with respect to an imaginary plane (E1) running in a longitudinal extension direction (24) of the pre-chamber (12) and dividing the pre-chamber (12) into a first half (H1) and a second half (H2) of equal size, first openings (B1) of the plurality of openings (16, B1, B2) are disposed in the first half (H1) and second openings (B2) of the plurality of openings (16, B1, B2) are disposed in the second half (H2);

wherein the first openings (B1) enclose a respective first angle ($\alpha 1$) with the imaginary plane (E1), wherein the second openings (B2) enclose a respective second angle ($\alpha 2$) with the imaginary plane (E1), and wherein a mean value of the first angles ($\alpha 1$) is greater than a mean value of the second angles ($\alpha 2$) such that the plurality of openings (16, B1, B2) are configured rotationally asymmetrically about an imaginary axis (A) running on the imaginary plane (E1) such that all of the plurality of openings (16, B1, B2) follow one another in an uneven or disordered manner which is not a regular sequence and such that the rotationally asymmetrical configuration of the plurality of openings (16, B1, B2) causes a tumble-shaped flow in the pre-chamber (12) of a fuel-air mixture that is introduced from the combustion chamber into the pre-chamber (12) via the plurality of openings (16, B1, B2);

wherein each of the plurality of openings (16, B1, B2) has a respective flow cross-section through which the fuel-air mixture is flowable;

wherein a number of the first openings (B1) disposed in the first half (H1) is greater than a number of the second openings (B2) disposed in the second half (H2);

wherein the plurality of openings (16, B1, B2) are formed as bores;

wherein a sum of the flow cross-sections of the first openings (B1) disposed in the first half (H1) is greater than a sum of the flow cross-sections of the second openings (B2) disposed in the second half (H2);

wherein the pre-chamber (12) is rotationally symmetrical with respect to the imaginary axis (A); and wherein the flow cross-sections of at least two of the plurality of openings (16, B1, B2) differ from each other with regard to a respective shape.

2. The pre-chamber spark plug (10) according to claim 1, wherein the respective angle ($\alpha 1$, $\alpha 2$) lies on a respective angular plane running in the longitudinal extension direction (24) of the pre-chamber (12) and extending obliquely or perpendicularly to the imaginary plane (E1).

3. The pre-chamber spark plug (10) according to claim 2, wherein the imaginary plane (E1) and the respective angular plane intersect in the imaginary axis (A).

4. The pre-chamber spark plug (10) according to claim 1, wherein the plurality of openings (16, B1, B2) are disposed along an imaginary circle, wherein a central point of the imaginary circle lies on the imaginary axis (A), and wherein the imaginary plane (E1) divides the imaginary circle into two halves of equal size.

5. The pre-chamber spark plug (10) according to claim 1, wherein the flow cross-sections of the first openings (B1) disposed in the first half (H1) are greater than the flow cross-sections of the second openings (B2) disposed in the second half (H2).

6. A combustion engine for a motor vehicle, comprising:
a combustion chamber; and
the pre-chamber spark plug (10) according to claim 1.

7. A motor vehicle, comprising:
a combustion engine with a combustion chamber; and
the pre-chamber spark plug (10) according to claim 1.

* * * * *